US008474121B2

(12) United States Patent
McGuire et al.

(10) Patent No.: US 8,474,121 B2
(45) Date of Patent: Jul. 2, 2013

(54) ALIGNMENT TOOLS AND METHODS OF TOOL ALIGNMENT

(75) Inventors: Andrew Ivor McGuire, Lexington, KY (US); Juan Manuel Molina, San Antonio, TX (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 231 days.

(21) Appl. No.: 12/845,109

(22) Filed: Jul. 28, 2010

(65) Prior Publication Data

US 2012/0023732 A1 Feb. 2, 2012

(51) Int. Cl.
*B23Q 15/14* (2006.01)

(52) U.S. Cl.
USPC .......... 29/464; 29/525.11; 81/121.1; 173/132

(58) Field of Classification Search
USPC .............. 173/29, 132; 81/121.1, 120; 29/255, 29/283, 271, 280, 464, 525.11
See application file for complete search history.

(56) References Cited

U.S. PATENT DOCUMENTS

| | | | | |
|---|---|---|---|---|
| 1,471,137 | A * | 10/1923 | Bowman | 408/112 |
| 3,527,273 | A * | 9/1970 | Falter | 81/429 |
| 4,475,853 | A | 10/1984 | Morgan | |
| 4,800,788 | A | 1/1989 | Goldstein | |
| 5,409,333 | A * | 4/1995 | Hu | 408/239 A |
| 6,021,555 | A | 2/2000 | Leong | |
| 6,128,982 | A | 10/2000 | Gwin, Sr. | |
| D462,001 | S | 8/2002 | Bohart et al. | |
| 6,824,036 | B2 | 11/2004 | Walter | |
| 7,354,230 | B2 * | 4/2008 | Bauman | 408/239 R |
| 7,658,310 | B1 | 2/2010 | Shomler et al. | |
| 2003/0170082 | A1 | 9/2003 | Garcia et al. | |

* cited by examiner

*Primary Examiner* — David Bryant
*Assistant Examiner* — Steven A Maynard
(74) *Attorney, Agent, or Firm* — Dinsmore & Shohl LLP

(57) ABSTRACT

An automated driver for tightening a fastener bolt includes a housing body including a handle. A chuck is rotatably connected to the housing body. An actuation system is operatively connected to the chuck for rotating the chuck. A tool element is held by the chuck, the tool element configured to engage the fastener bolt. An alignment tool is connected to the chuck. The alignment tool includes a chuck receiving portion having an opening extending therethrough in which the chuck is located and a bit receiving portion having an opening extending therethrough in which the tool element is located. An end of the tool element extends beyond an end of the bit receiving portion.

14 Claims, 7 Drawing Sheets

ALIGNMENT TOOLS AND METHODS OF TOOL ALIGNMENT

TECHNICAL FIELD

The present specification generally relates to alignment tools and methods of using alignment tools to provide repeatable guiding of tools during a manufacturing operation.

BACKGROUND

In the manufacturing of automobiles on an assembly line, there are many repetitive process steps. Some of the process steps are performed manually using a variety of tools. When products are manually assembled, it may be somewhat difficult to accurately align fasteners for tightening. Incorrect alignment of a fastener during a tightening process can result in a cross-threaded condition, for example. In many instances, an automobile must be taken off-line and repaired if a cross-threaded condition occurs, which causes delay in vehicle production.

SUMMARY

In one embodiment, an automated driver for tightening a fastener bolt includes a housing body including a handle. A chuck is rotatably connected to the housing body. An actuation system is operatively connected to the chuck for rotating the chuck. A tool element is held by the chuck, the tool element configured to engage the fastener bolt. An alignment tool is connected to the chuck. The alignment tool includes a chuck receiving portion having an opening extending therethrough in which the chuck is located and a bit receiving portion having an opening extending therethrough in which the tool element is located. An end of the tool element extends beyond an end of the bit receiving portion.

In another embodiment, a method of aligning an automated driver for a torque tightening operation comprises: manually grasping the automated driver, the automated driver comprising a housing body including a handle; a chuck rotatably connected to the housing body; an actuation system operatively connected to the chuck for rotating the chuck; a tool element held by the chuck, the tool element configured to engage a fastener bolt; and an alignment tool connected to the chuck, the alignment tool including a chuck receiving portion having an opening extending therethrough in which the chuck is located and a bit receiving portion having an opening extending therethrough in which the tool element is located, an end of the tool element extending beyond an end of the bit receiving portion; engaging the tool element with a fastener bolt having surrounding housing structure, the housing structure having an opening for allowing access to the fastener bolt; engaging a first sidewall of the alignment tool with a first datum provided by the surrounded housing structure after the step of engaging the tool element with the fastener bolt for limiting vertical movement of the automated driver; and engaging a second sidewall of the alignment tool with a second datum provided by the surrounding housing structure after the step of engaging the tool element with the fastener bolt for limiting horizontal movement of the automated driver.

In another embodiment, a method of connecting an alignment tool to an automated driver for a torque tightening operation comprises: manually grasping the automated driver, the automated driver comprising a housing body including a handle; a chuck rotatably connected to the housing body; an actuation system operatively connected to the chuck for rotating the chuck; and a tool element held by the chuck, the tool element configured to engage a fastener bolt; locating the chuck in a chuck receiving opening of a chuck receiving portion of an alignment tool; locating the tool element in a bit receiving opening of a bit receiving portion of the alignment tool; and inserting a fastener through a fastener receiving opening extending inwardly from a periphery of the chuck receiving opening to the chuck receiving opening and into a groove extending about a periphery of the chuck such that the chuck rotates relative to the alignment tool during a torque tightening process.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to alignment tools for use in aligning a primary tool that is used in an assembly process. The primary tool may be a hand-held primary tool that is used by an operator, for example, during a torque tightening process. The torque tightening process may be engaged in repeatedly by the operator working, for example, on an assembly line. The alignment tool may be used in guiding the primary tool to a proper tightening position relative to a fastener being tightened, as an example. Use of the alignment tool can reduce instances of misalignment during a torque tightening process, which can reduce cross-threading and resulting manufacturing delays. A vehicle assembly line where the operator repeatedly attaches a horn pad to a steering wheel will be discussed below, however, the alignment tools may be used in the assembly of objects other than steering wheels and vehicles.

Figure 1:
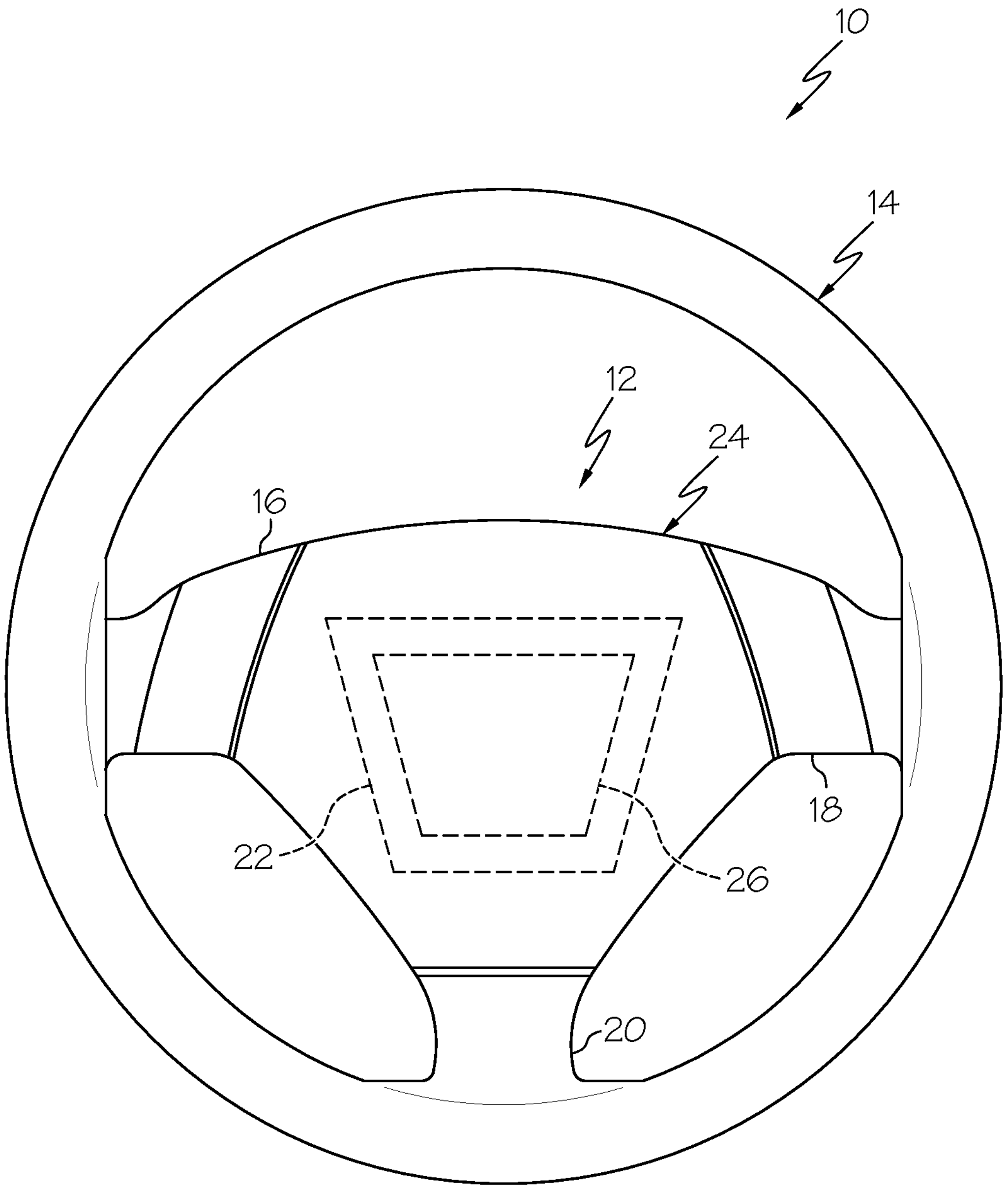
FIG. 1 is a front view of a steering wheel according to one or more embodiments shown and described herein.

Referring to FIG. 1, an exemplary steering wheel 10 may generally include a hub portion 12 and a rim portion 14 that extends about the hub portion 12 for grasping by an operator of the vehicle. In some embodiments, the steering wheel 10 includes spokes 16, 18 and 20 that extend in a radial direction between the hub portion 12 and the rim portion 14 and connect the rim portion 14 to the hub portion 12. One or more of the spokes 16, 18 and 20 may include one or more user control elements, such as buttons, knobs, switches, etc., that can be used to control functions of the vehicle, such as radio volume, cruise control, radio tuning, etc. The steering wheel 10 may further include an air bag apparatus 22 that is mounted within a frame 24 of the steering wheel 10. As will be described below, the air bag apparatus 22 may include a horn pad 26 associated therewith that is mounted within the hub portion 12 of the vehicle.

Figure 2:
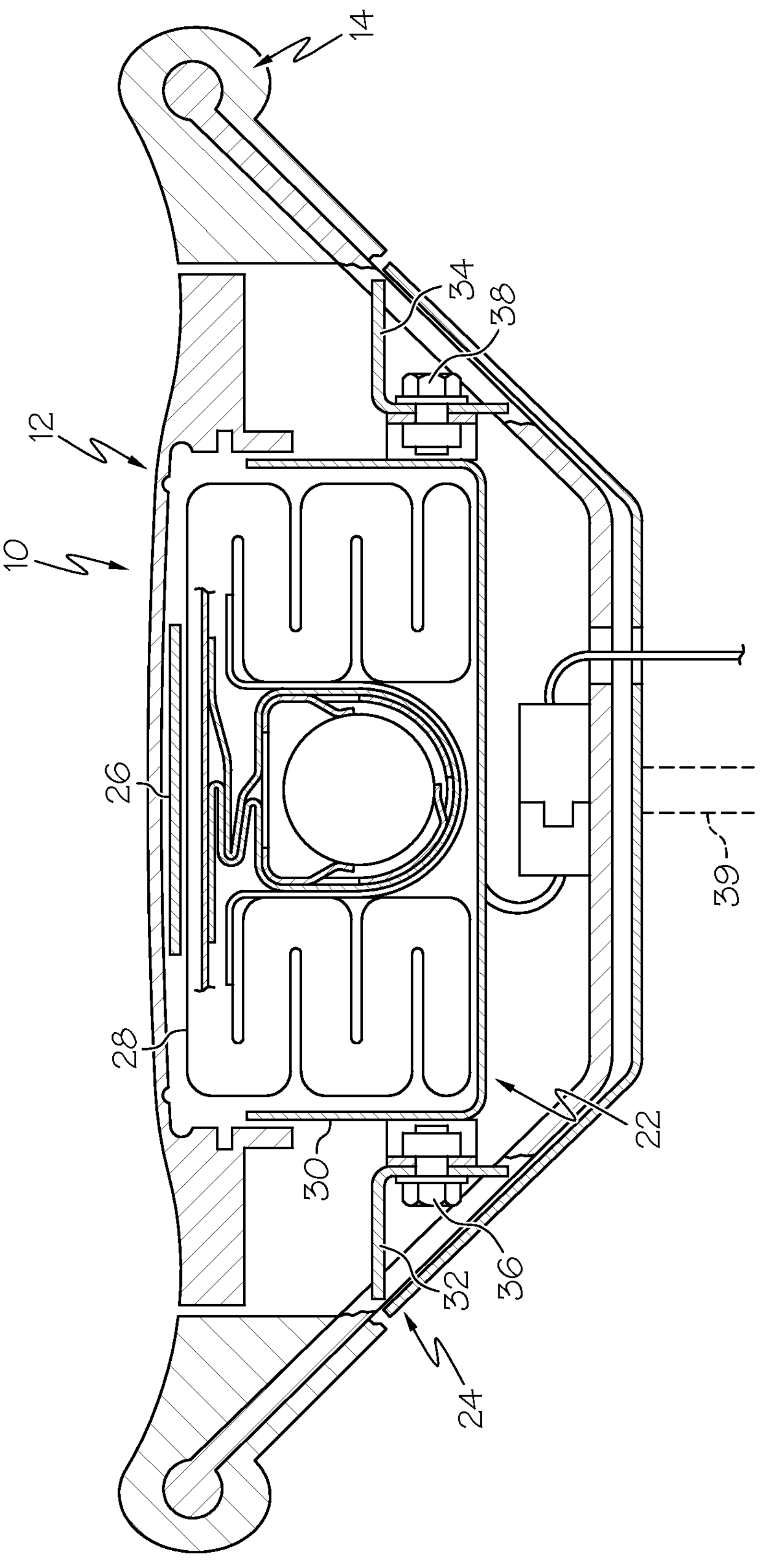
FIG. 2 is a section view of the steering wheel of FIG. 1 according to one or more embodiments shown and described herein.

Referring to FIG. 2, the air bag apparatus 22 with the horn pad 26 and an air bag body 28 is shown connected to the frame 24. In some embodiments, the air bag apparatus 22 includes an air bag case 30 that is connected to the frame 24 using brackets 32 and 34. The air bag case 30 may be connected to the brackets 32 and 34 using fastener bolts 36 and 38. As can be seen by FIG. 2, in some embodiments, the fastener bolts 36 and 38 may be oriented at an angle to a steering shaft (represented by dotted line 39). In other words, the fastener bolts 36 and 38 may extend in the widthwise direction of the vehicle and be located forward of the rim portion 14 and hub portion 12.

Figure 3:
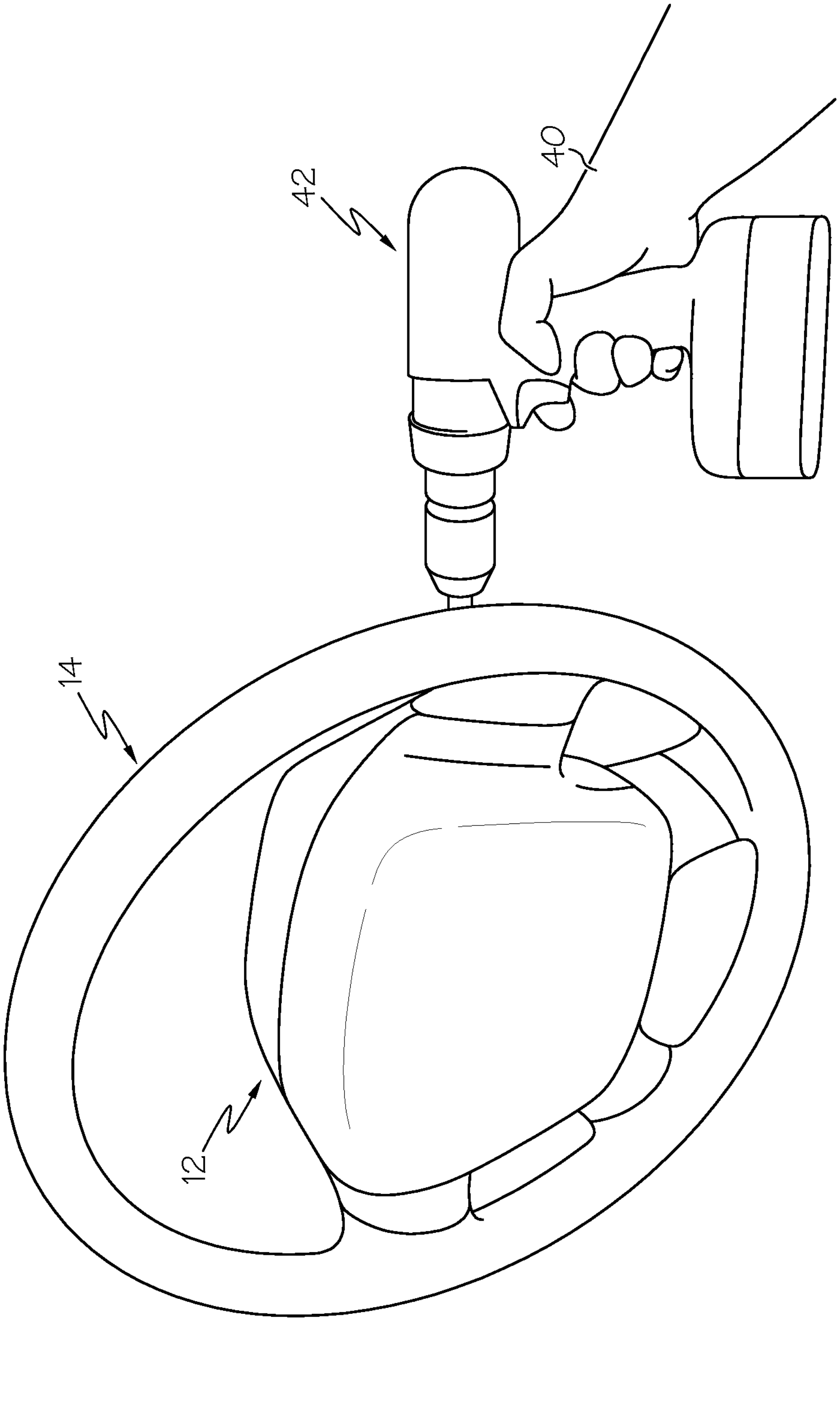
FIG. 3 illustrates a torque tightening process during which an air bag assembly is connected to the steering wheel of FIG. 1 according to one or more embodiments shown and described herein.

Referring briefly to FIG. 3, the widthwise orientation and location of the fastener bolts 36 and 38 forward of the rim and hub portions 14 and 12 can make it cumbersome for an operator 40 to tighten the fastener bolts 36 and 38 during repeated torque tightening operations using a primary tool 42 such as on an assembly line. In some embodiments, the primary tool 42 may be an automatic torque-limiting driver. The automatic driver may be powered using compressed air, electric power or hydraulic power. As can be seen by FIG. 3, the automatic driver 42 is located forward of the rim and hub portions 14 and 12 and placed in a vehicle widthwise orientation when tightening the fastener bolts 36 and 38. As used herein, the term "automatic driver" is meant to include any powered tool for tightening a fastener, such as impact wrenches, impact drivers, automatic screwdrivers, etc.

Figure 4:
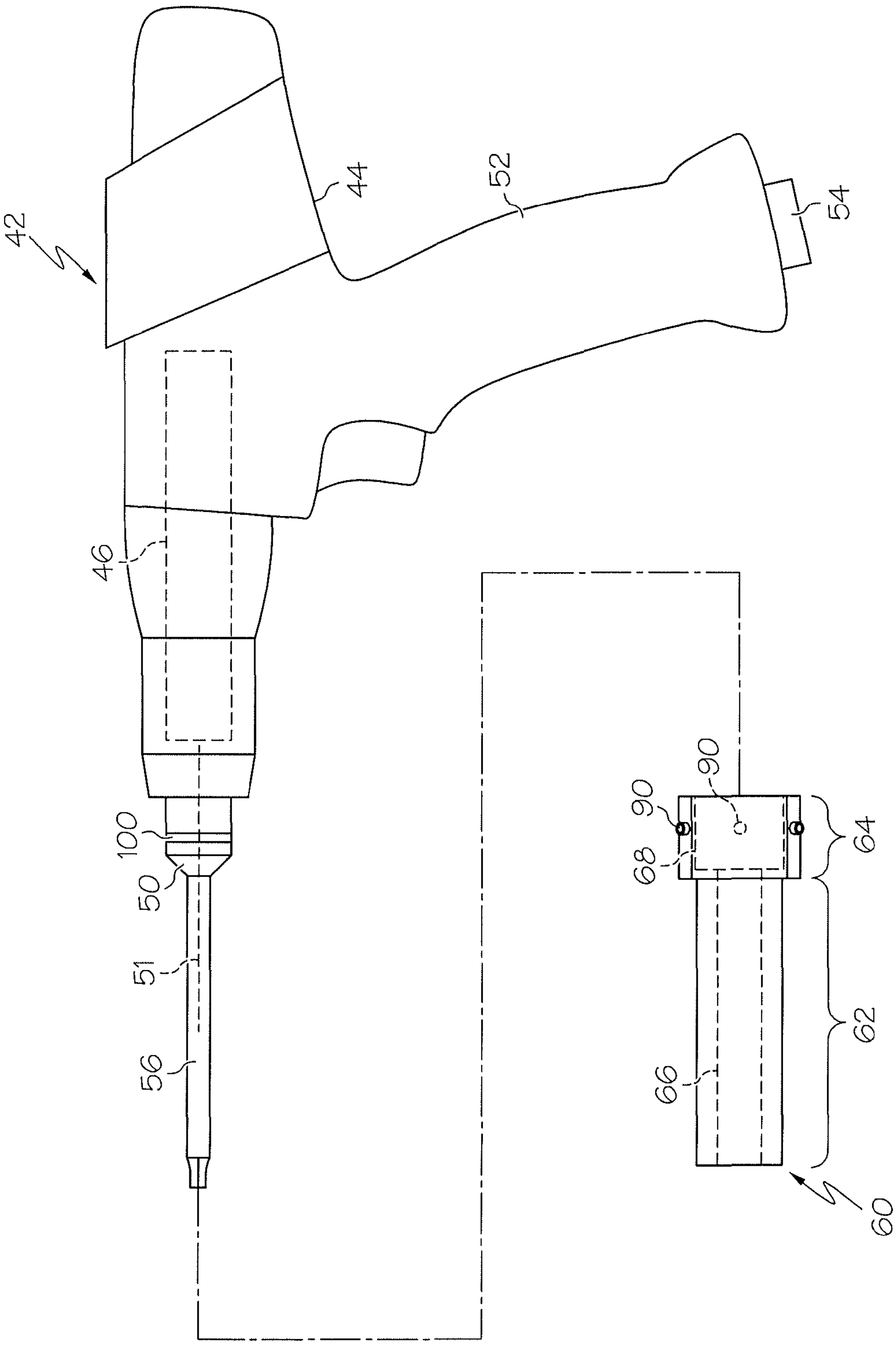
FIG. 4 is an exploded view of an automatic torque-limiting driver and alignment tool according to one or more embodiments shown and described herein.

Referring to FIG. 4, an exemplary automatic torque-limiting driver 42 includes a housing body 44 supporting an actuation system 46 which is operable to drive a chuck 50. The chuck 50 is supported on a spindle and is driven by the actuation system 46. In the depicted embodiment, the actuation system 46 drives the chuck 50 by rotating the chuck 50 around an axis of rotation 51.The chuck 50 operable to support a tool element 56, such as, for example, a torx bit. Other bits may also be supported by the chuck 50, such as a variety of drill and screwdriver bits. The actuation system 46 may include a gear arrangement that is operable to allow adjustment of the actuation system 46 between torque settings. An adjustable torque clutch and hammer mechanism may also be provided that is operable by the operator to set the torque setting and to set the condition of the hammer mechanism, if a hammer mechanism is provided.

A handle 52 may be connected to the housing body 44. The handle 52 may be graspable by the operator and may include a connector 54 (e.g., a quick-connector) for connecting the automatic driver 42 to a power source, such as, for example, a compressed air source. In another embodiment, the handle may include a power source such as a battery housed therein. The power source may be used to power the actuation system 46, which is used to rotate the chuck 50.

An alignment tool 60 may be connected to the automatic driver 42. The alignment tool 60 may include a bit receiving portion 62 and a chuck receiving portion 64. The bit receiving portion 62 may include a bit receiving opening 66 extending therethrough that is sized to receive the tool element 56. The chuck receiving portion 64 may include a chuck receiving opening 68 extending therethrough to the bit receiving portion 62 that is sized to receive the chuck 50. In some embodiments, the chuck receiving opening 68 has a diameter that is greater than a diameter of the bit receiving opening 66. The diameters of the openings 68 and 66 may be selected to allow rotation of the chuck 50 and the tool element 56 relative to the alignment tool 60 during the torque tightening operations.

Figure 5:
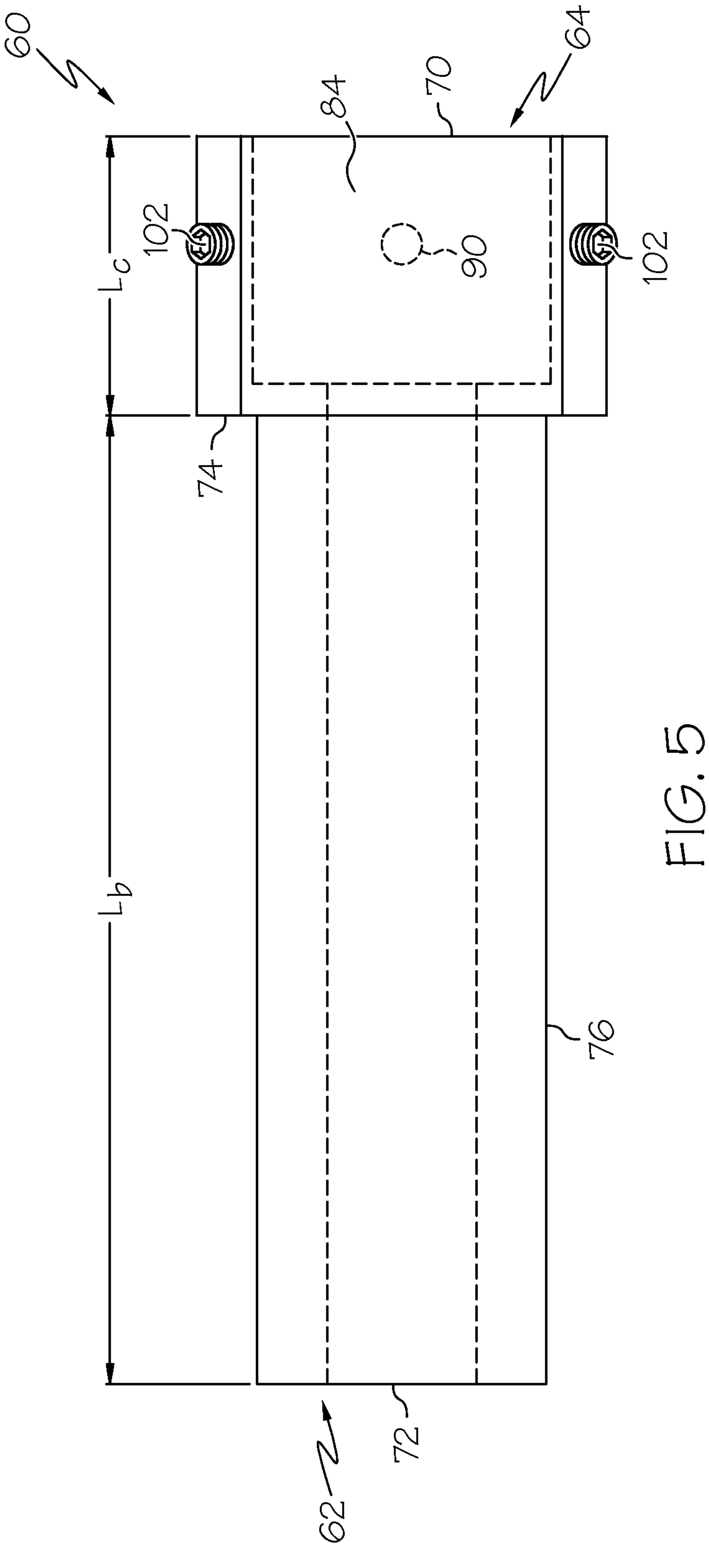
FIG. 5 is a side view of the alignment tool of FIG. 4 shown in isolation according to one or more embodiments shown and described herein.
Figure 6:
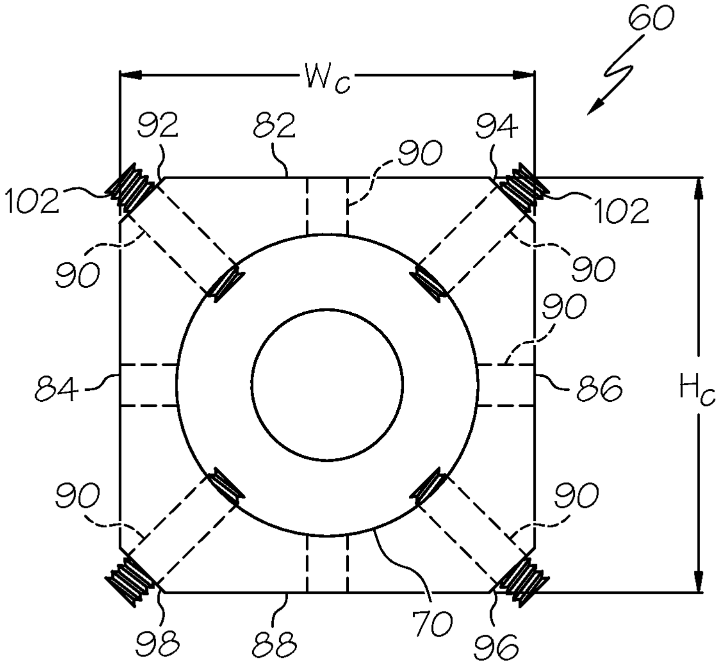
FIG. 6 is an end view of the alignment tool of FIG. 5 according to one or more embodiments shown and described herein.
Figure 7:
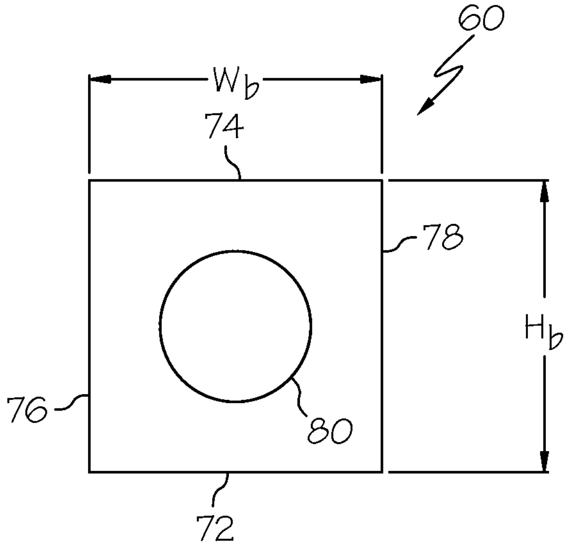
FIG. 7 is another end view of the alignment tool of FIG. 5 according to one or more embodiments shown and described herein.

FIGS. 5-7 illustrate the alignment tool 60 in isolation. The alignment tool 60 includes a first end 70 associated with the chuck receiving portion 64 and an opposite, second end 72 associated with the bit receiving portion 62. In some embodiments, a step 73 is provided between the chuck receiving portion 64 and the bit receiving portion 62 such that the chuck receiving portion 64 has a dimension that is greater than the bit receiving portion 62. In other embodiments, the transition from the bit receiving portion 62 to the chuck receiving portion 64 may be relatively smooth. As can be seen by FIGS. 5-7, the bit receiving portion 62 may be somewhat box-shaped with sidewalls 74, 76, 78 and 80 extending from the second end 72 to the chuck receiving portion 64, and adjacent sidewalls 74, 76, 78, 80 being transverse to one another. The chuck receiving portion 64 may also be somewhat box-shaped with sidewalls 82, 84, 86 and 88 extending from the first end 70 to the bit receiving portion 62.

In the illustrated embodiment, the bit receiving portion 66 has a length Lb that is greater than a length Lc of the chuck receiving portion 64. The length Lb may be selected to allow the tool element 56 to extend beyond the second end 72. Additionally, the chuck receiving portion 64 has a width Wc and height Hc that are greater than a width Wb and height Hc of the bit receiving portion 66. The lengths Lb and Lc, widths Wb and Wc and heights Hb and Hc may be generally selected to allow the alignment tool 60 to receive the tool element 56 and/or chuck 50 and to allow the tool element 56 to engage the fastener bolts while still providing the alignment structure, as will be described in greater detail below.

The chuck receiving portion 64 includes connecting structure (e.g., fastener openings 90) for connecting the alignment tool 60 to the automatic driver 42. In the illustrated embodiment, the fastener openings 90 are located about the periphery of the chuck receiving portion 64 at corners 92, 94, 96 and 98 where the sidewalls 82, 84, 86 and 88 meet. In other embodiments (represented by dotted lines), the fastener openings 90 may extend through one or more of the sidewalls 82, 84, 86 and 88, spaced from the corners 92, 94, 96 and 98. The fastener openings 90 extend inwardly from the corners 92, 94, 96 and 98 and intersect the chuck receiving opening 68 such that fasteners (e.g., screws) can be inserted through the openings 90 and intersect the chuck receiving opening 68. Referring back to FIG. 4, the chuck 50 may include one or more groove 100 into which an end of the fasteners 102 can be inserted. The fasteners 102 may be inserted into the groove 100 a distance and/or with such a force to retain the alignment tool 60 on the automatic driver 42 yet allow rotation of the chuck 50 relative to the alignment tool 60 during a torque tightening operation.

Figure 8:
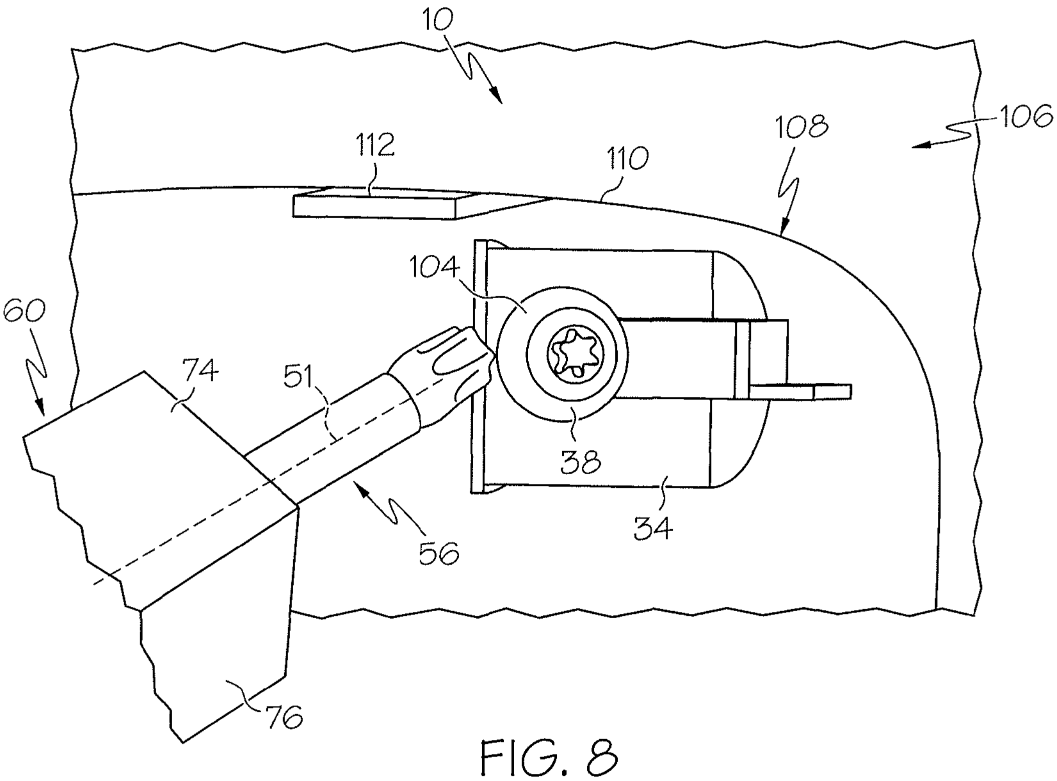
FIG. 8 illustrates a torque tightening operation for connecting the air bag assembly to the steering wheel according to one or more embodiments shown and described herein.

Referring to FIG. 8, an embodiment of a torque tightening operation for tightening the air bag apparatus 22 with the horn pad 26 and air bag body 28 to the frame 24 includes aligning the tool element, in this case torx bit 56, with a head 104 of the fastener bolt 38. This alignment may be accomplished by engaging the torx bit 56 with the head 104 of the fastener bolt 38. As clearly depicted, the sidewalls 74, 76, 78, 80 are generally parallel to and offset from the axis of rotation 51 of the chuck 50.

Figure 9:
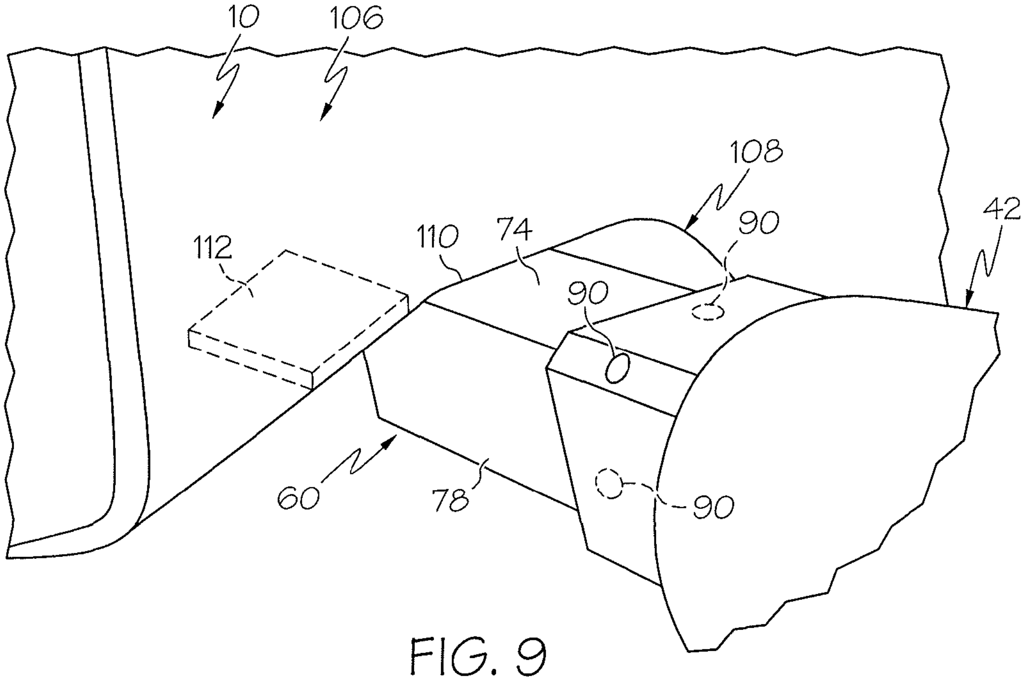
FIG. 9 is another illustration of the torque tightening process of FIG. 8 according to one or more embodiments shown and described herein.

Referring also to FIG. 9, the steering wheel 10 includes a steering wheel housing 106 having an opening 108 that allows access to the fastener bolt 38. Once the torx bit 56 is engaged with the head 104 of the fastener bolt 38, the automatic driver 42 may be tilted in an upward fashion until the one of the sidewalls 74, 76, 78 and 80 of the alignment tool 60 engages an edge 110 of the steering wheel housing 106 surrounding the opening 108. The edge 110 of the steering wheel housing 106 provides a first datum that is used to properly align the automatic driver 42. An alignment tab structure 112 is located adjacent the fastener bolt 38. The automatic driver 42 can be tilted toward the alignment tab structure 112 until another of the sidewalls 74, 76, 78 and 80 of the alignment tool 60 engages the alignment tab structure 112. The alignment tab structure 112 provides a second datum that is used to properly align the automatic driver. Thus, the alignment tool 60 can engage both the first and second datums which limit movement of the automatic driver 42 in two axial directions (vertically and horizontally) and aligns the torx bit 56 with the fastener bolt 38. Once the first and second datums are engaged, the operator can trigger the automatic driver for the torque tightening operation.

The above-described alignment tool can be used in guiding the primary tool to a proper tightening position relative to a fastener being tightened. The alignment tool 60 may be formed of any suitable material such as plastics and/or metals and using any suitable process such as molding, machining, etc. Use of the alignment tool can reduce instances of misalignment during a torque tightening process, which can reduce cross-threading and resulting manufacturing delays. While the alignment tool is illustrated as box-shaped, the alignment tool may be other shapes depending on the structure surrounding the fastener bolt being fastened. In embodiments described above, the alignment tool is engaged at only two sidewalls 74, 76, 78 and 80 during alignment. However, other alignment arrangements are contemplated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automated driver for tightening a fastener bolt, comprising:

a housing body including a handle;

a chuck rotatably connected to the housing body;

an actuation system operatively connected to the chuck for rotating the chuck;

a tool element held by the chuck, the tool element configured to engage the fastener bolt;

an alignment tool connected to the chuck, the alignment tool including a chuck receiving portion having an opening extending therethrough in which the chuck is located and a bit receiving portion having an opening extending therethrough in which the tool element is located, an end of the tool element extending beyond an end of the bit receiving portion;

a fastener opening extending inwardly from a periphery of the chuck receiving portion for receiving a fastener, the fastener opening intersection the chuck receiving opening; and a fastener extending through the fastener opening and received in a groove extending about an entire circumferential periphery of the chuck for limiting movement of the alignment tool along a length of the chuck while allowing rotation of the chuck relative to the alignment tool during a torque tightening operation.

2. The automated driver of claim 1, wherein the alignment tool includes a fastener opening extending inwardly from a periphery of the chuck receiving portion for receiving a fastener, the fastener opening intersecting the chuck receiving opening.

3. The automated driver of claim 1, wherein the opening extending through the bit receiving portion has a dimension that is less than the opening extending through the chuck receiving portion.

4. The automated driver of claim 3, wherein the chuck receiving portion has a width and a height that is greater than a width and a height of the bit receiving portion.

5. The automated driver of claim 4, wherein the bit receiving portion has a length that is greater than a length of the chuck receiving portion.

6. A method of aligning an automated driver for a torque tightening operation, the method comprising:

manually grasping the automated driver, the automated driver comprising a housing body including a handle;

a chuck rotatably connected to the housing body;

an actuation system operatively connected to the chuck for rotating the chuck;

a tool element held by the chuck, the tool element configured to engage a fastener bolt; and an alignment tool connected to the chuck, the alignment tool including a chuck receiving portion having an opening extending therethrough in which the chuck is located and a bit receiving portion having an opening extending therethrough in which the tool element is located, an end of the tool element extending beyond an end of the bit receiving portion;

a fastener opening extending inwardly from a periphery of the chuck receiving portion for receiving a fastener, the fastener opening intersecting the chuck receiving opening;

a fastener extending through the fastener opening and received in a groove extending about an entire circumferential periphery of the chuck for limiting movement of the alignment tool along a length of the chuck while allowing rotation of the chuck relative to the alignment tool during a torque tightening operation;

engaging the tool element with a fastener bolt having surrounding housing structure, the housing structure having an opening for allowing access to the fastener bolt;

engaging a first sidewall of the alignment tool with a first datum provided by the surrounding housing structure after the step of engaging the tool element with the fastener bolt for limiting vertical movement of the automated driver; and engaging a second sidewall of the alignment tool with a second datum provided by the surrounding housing structure after the step of engaging the tool element with the fastener bolt for limiting horizontal movement of the automated driver.

7. The method of claim 6 further comprising triggering the automated driver to tighten the fastener bolt, the chuck and the tool element rotating relative to the alignment tool.

8. The method of claim 7, wherein the step of triggering the automated driver to tighten the fastener bolt tightens an air bag assembly to a steering wheel.

9. The method of claim 6 further comprising attaching the alignment tool to the chuck by inserting a fastener into a fastener opening extending from a periphery of the chuck receiving portion to the opening extending through the chuck receiving portion, the fastener being received within a groove extending about a periphery of the chuck for limiting movement of the alignment tool along a length of the chuck.

10. The method of claim 6, wherein the opening extending through the bit receiving portion has a dimension that is less than the opening extending through the chuck receiving portion.

11. The method of claim 10, wherein the chuck receiving portion has a width and a height that is greater than a width and a height of the bit receiving portion.

12. The method of claim 11, wherein the bit receiving portion has a length that is greater than a length of the chuck receiving portion.

13. The automated driver of claim 1, wherein the bit receiving portion further comprises a first sidewall generally parallel to and offset from an axis of rotation of the chuck.

14. The automated driver of claim 13, wherein the bit receiving portion further comprises a second sidewall generally parallel to and offset from the axis of rotation of the chuck and transverse to the first sidewall.

* * * * *

UNITED STATES PATENT AND TRADEMARK OFFICE

CERTIFICATE OF CORRECTION

PATENT NO. : 8,474,121 B2
APPLICATION NO. : 12/845109
DATED : July 2, 2013
INVENTOR(S) : Andrew Ivor McGuire It is certified that error appears in the above-identified patent and that said Letters Patent is hereby corrected as shown below:

In the Claims:

In Claim No. 1, line 5 of Column 6, "... fastener opening intersection ..." has been changed to "... fastener opening intersecting ..."

Signed and Sealed this
Third Day of September, 2013

Teresa Stanek Rea
*Acting Director of the United States Patent and Trademark Office*